(12) United States Patent
Park et al.

(10) Patent No.: US 12,021,252 B2
(45) Date of Patent: Jun. 25, 2024

(54) BATTERY MODULE, BATTERY PACK COMPRISING SUCH BATTERY MODULE, AND VEHICLE COMPRISING SUCH BATTERY PACK

(71) Applicant: LG Chem, Ltd., Seoul (KR)

(72) Inventors: Do-Hyun Park, Daejeon (KR);
Jung-Min Kwak, Daejeon (KR);
Young-Ho Lee, Daejeon (KR);
Jong-Ha Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 758 days.

(21) Appl. No.: 17/055,368

(22) PCT Filed: Dec. 20, 2019

(86) PCT No.: PCT/KR2019/018248
§ 371 (c)(1),
(2) Date: Nov. 13, 2020

(87) PCT Pub. No.: WO2020/138870
PCT Pub. Date: Jul. 2, 2020

(65) Prior Publication Data
US 2021/0218098 A1    Jul. 15, 2021

(30) Foreign Application Priority Data
Dec. 26, 2018   (KR) .................. 10-2018-0169946

(51) Int. Cl.
*H01M 50/211*     (2021.01)
*H01M 50/249*     (2021.01)
(Continued)

(52) U.S. Cl.
CPC ....... *H01M 50/249* (2021.01); *H01M 50/211* (2021.01); *H01M 50/50* (2021.01);
(Continued)

(58) Field of Classification Search
CPC .. H01M 50/249; H01M 50/211; H01M 50/50; H01M 50/502; H01M 50/581;
(Continued)

(56) References Cited

U.S. PATENT DOCUMENTS

| | | | |
|---|---|---|---|
| 6,261,719 B1 * | 7/2001 | Ikeda .................. | H01M 50/507 429/177 |
| 2012/0225327 A1 * | 9/2012 | Ma ...................... | H01M 50/569 429/7 |

(Continued)

FOREIGN PATENT DOCUMENTS

| | | |
|---|---|---|
| CN | 103650209 A | 3/2014 |
| CN | 104081559 A | 10/2014 |

(Continued)

OTHER PUBLICATIONS

Search Report dated Jun. 3, 22 from Office Action for Chinese Application No. 201980030864.9 dated Jun. 15, 2022. 2 pgs.

(Continued)

*Primary Examiner* — Kaity V Chandler
(74) *Attorney, Agent, or Firm* — Lerner David LLP

(57) ABSTRACT

A battery module according to an embodiment of the present disclosure includes a plurality of battery cells, a module case accommodating the plurality of battery cells therein, a busbar frame assembly slidably inserted into the module case to support the plurality of battery cells, the busbar frame assembly including a plurality of busbars electrically connected to electrode leads of the plurality of battery cells, and a fuse unit connected to at least one pair of busbars of the plurality of busbars, the fuse unit being provided between the at least one pair of busbars.

9 Claims, 8 Drawing Sheets

(51) Int. Cl.
  *H01M 50/50* (2021.01)
  *H01M 50/502* (2021.01)
  *H01M 50/581* (2021.01)
  *H01M 50/583* (2021.01)
  *H01M 50/284* (2021.01)
  *H01M 50/569* (2021.01)

(52) U.S. Cl.
  CPC ....... *H01M 50/502* (2021.01); *H01M 50/581* (2021.01); *H01M 50/583* (2021.01); *H01M 50/284* (2021.01); *H01M 50/569* (2021.01); *H01M 2200/103* (2013.01); *H01M 2220/20* (2013.01)

(58) Field of Classification Search
  CPC ............. H01M 50/583; H01M 50/284; H01M 50/569; H01M 2200/103; H01M 2220/20; H01M 50/503; H01M 50/507; H01M 50/20; Y02E 60/10; Y02T 10/70
  See application file for complete search history.

(56) References Cited

U.S. PATENT DOCUMENTS

| | | |
|---|---|---|
| 2013/0252052 A1 | 9/2013 | Dawley |
| 2013/0288530 A1 | 10/2013 | Zhao |
| 2014/0065467 A1* | 3/2014 | Choi ................. H01M 50/583 174/68.2 |
| 2014/0134462 A1 | 5/2014 | Choi et al. |
| 2014/0356671 A1* | 12/2014 | Dawley ............... H01M 50/569 429/90 |
| 2016/0049695 A1 | 2/2016 | Lim et al. |
| 2017/0352859 A1 | 12/2017 | Okamoto |
| 2018/0076493 A1* | 3/2018 | Park .................... H01M 50/227 |
| 2018/0194235 A1* | 7/2018 | Kim ........................ B60L 50/50 |
| 2018/0198172 A1 | 7/2018 | Choi et al. |
| 2018/0315986 A1 | 11/2018 | Hirano |
| 2019/0001838 A1 | 1/2019 | Choi et al. |
| 2019/0027731 A1* | 1/2019 | Zeng ..................... H01M 50/51 |
| 2019/0260099 A1 | 8/2019 | Ju et al. |
| 2019/0341588 A1* | 11/2019 | Ligabue ............ H01M 10/6551 |
| 2020/0014005 A1 | 1/2020 | Lee et al. |

FOREIGN PATENT DOCUMENTS

| | | | | |
|---|---|---|---|---|
| CN | 107710456 A | 2/2018 | | |
| CN | 105375076 B | 7/2018 | | |
| CN | 108463902 A | 8/2018 | | |
| CN | 208000949 U | * 10/2018 | ............. | Y02E 60/10 |
| CN | 209071494 U | * 7/2019 | ............. | Y02E 60/10 |
| EP | 3686964 A1 | 7/2020 | | |
| JP | 2014519153 A | 8/2014 | | |
| JP | 2018515902 A | 6/2018 | | |
| KR | 20130018494 A | 2/2013 | | |
| KR | 20140003871 A | 1/2014 | | |
| KR | 20140095660 A | 8/2014 | | |
| KR | 20160019701 A | 2/2016 | | |
| KR | 20160105360 A | 9/2016 | | |
| KR | 20170007996 A | 1/2017 | | |
| KR | 20180038253 A | 4/2018 | | |
| KR | 20180078778 A | 7/2018 | | |
| KR | 20180099440 A | 9/2018 | | |
| KR | 20180135701 A | 12/2018 | | |
| WO | 2014003353 A1 | 1/2014 | | |
| WO | WO-2016199558 A1 | * 12/2016 | ............. | H01G 11/10 |
| WO | 2018066797 A1 | 4/2018 | | |
| WO | WO-2018221818 A1 | * 12/2018 | ............. | H01M 2/02 |

OTHER PUBLICATIONS

International Search Report for Application No. PCT/KR2019/018248 dated Apr. 3, 2020, 2 pages.

Search Report dated Oct. 31, 2022 from the Office Action for Chinese Application No. 201980030864.9 dated Nov. 11, 2022, 3 pages.

* cited by examiner

BATTERY MODULE, BATTERY PACK COMPRISING SUCH BATTERY MODULE, AND VEHICLE COMPRISING SUCH BATTERY PACK

CROSS-REFERENCE TO RELATED APPLICATIONS

The present application is a national phase entry under 35 U.S.C. § 371 of International Application No. PCT/KR2019/018248, filed on Dec. 20, 2019, published in Korean, which claims priority to Korean Patent Application No. 10-2018-0169946 filed on Dec. 26, 2018, the disclosures of which are incorporated herein by reference.

TECHNICAL FIELD

The present disclosure relates to a battery module, a battery pack including the battery module, and a vehicle including the battery pack.

BACKGROUND ART

Due to high applicability to various products and excellent electrical properties such as high energy density, secondary batteries are being broadly used not only in portable devices but also in electric vehicles (EVs) or hybrid electric vehicles (HEVs) driven by electrical power sources. The secondary batteries are attracting attention as a new energy source for increasing environment friendliness and energy efficiency because they may significantly reduce the use of fossil fuels and do not generate any by-products of energy consumption.

Currently popular secondary batteries include lithium ion batteries, lithium polymer batteries, nickel cadmium batteries, nickel hydrogen batteries, nickel zinc batteries, etc. Such a unit secondary battery cell, i.e., a unit battery cell, has an operating voltage of about 2.5 V to 4.5 V. Therefore, when a higher output voltage is required, a plurality of battery cells may be connected in series to configure a battery pack. Based on a charge/discharge capacity required for a battery pack, a plurality of battery cells may be connected in parallel to configure the battery pack. As such, the number of battery cells included in a battery pack may be variously set depending on a required output voltage or charge/discharge capacity.

To configure a battery pack by connecting a plurality of battery cells in series or in parallel, generally, a battery module including at least one battery cell is configured first and then a battery pack is configured by adding other components to at least one battery module.

In general, a battery module includes a fuse unit which is disconnected to cut off a current of the battery module when the current exceeds an allowable current, in order to prevent an accident such as explosion of battery cells due to overvoltage or overcurrent. The fuse unit is generally provided outside the battery module.

However, depending on the location of the fuse unit, when the battery module is mounted in a battery pack or another structure, a dead space which causes spatial loss or spatial restriction is generated by a space occupied by the fuse unit.

Therefore, a solution for providing a battery module capable of minimizing a dead space generated due to mounting of a fuse unit, a battery pack including the battery module, and a vehicle including the battery pack is required.

DISCLOSURE

Technical Problem

The present disclosure is directed to providing a battery module capable of minimizing a dead space generated due to mounting of a fuse unit, a battery pack including the battery module, and a vehicle including the battery pack.

Technical Solution

In one aspect of the present disclosure, there is provided a battery module including a plurality of battery cells, a module case configured to accommodate the plurality of battery cells, a busbar frame assembly slidably inserted into the module case to support the plurality of battery cells and including a plurality of busbars electrically connected to electrode leads of the plurality of battery cells, and a fuse unit connected to at least one pair of busbars from among the plurality of busbars and provided between the plurality of busbars.

The plurality of busbars may be symmetrically provided by disposing the fuse unit between the plurality of busbars.

The fuse unit may be provided in a middle of at least one of front and rear surfaces of the busbar frame assembly.

The fuse unit may include a pair of connection members connected to the at least one pair of busbars, and a fuse body provided between the pair of connection members and disconnected when an overcurrent over a predetermined value flows.

The fuse unit may further include a pair of coupling members configured to couple the pair of busbars to the pair of connection members.

The busbar frame assembly may include front and rear frames including the plurality of busbars, and a top frame configured to connect the front frame to the rear frame, and the fuse unit may be provided on at least one of the front and rear frames.

The fuse unit may be provided in a middle of the at least one of the front and rear frames.

The front and rear frames may be rotatably hinge-coupled to the top frame.

In another aspect of the present disclosure, there is provided a battery pack including at least one battery module according to the afore-described embodiments, and a pack case configured to package the at least one battery module.

In another aspect of the present disclosure, there is provided a vehicle including the battery pack according to the afore-described embodiments.

Advantageous Effects

According to the afore-described various embodiments, a battery module capable of minimizing a dead space generated due to mounting of a fuse unit, a battery pack including the battery module, and a vehicle including the battery pack may be provided.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

The present disclosure will become more apparent by describing in detail embodiments thereof with reference to the attached drawings. It should be understood that the embodiments described herein are only illustrative for better understanding of the present disclosure and may be modified in various ways. In addition, for ease of understanding of the present disclosure, the accompanying drawings are not illustrated in a real scale and the dimensions of some components may be exaggerated.

Figure 1:
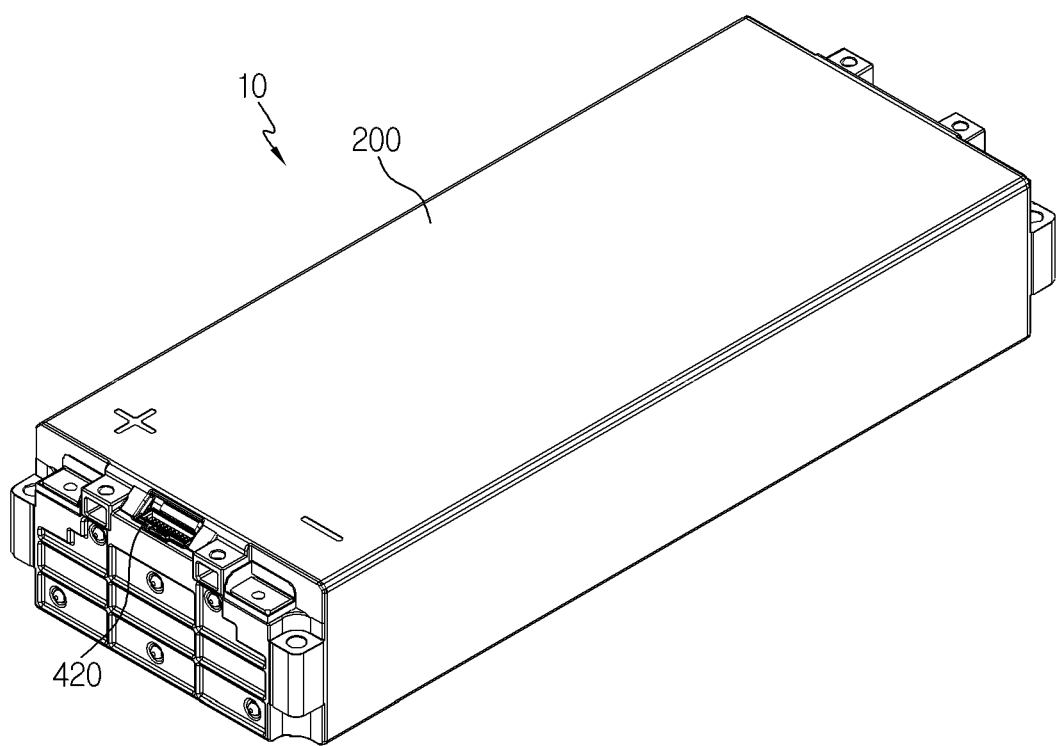
FIG. 1 is a view for describing a battery module according to an embodiment of the present disclosure.
Figure 2:
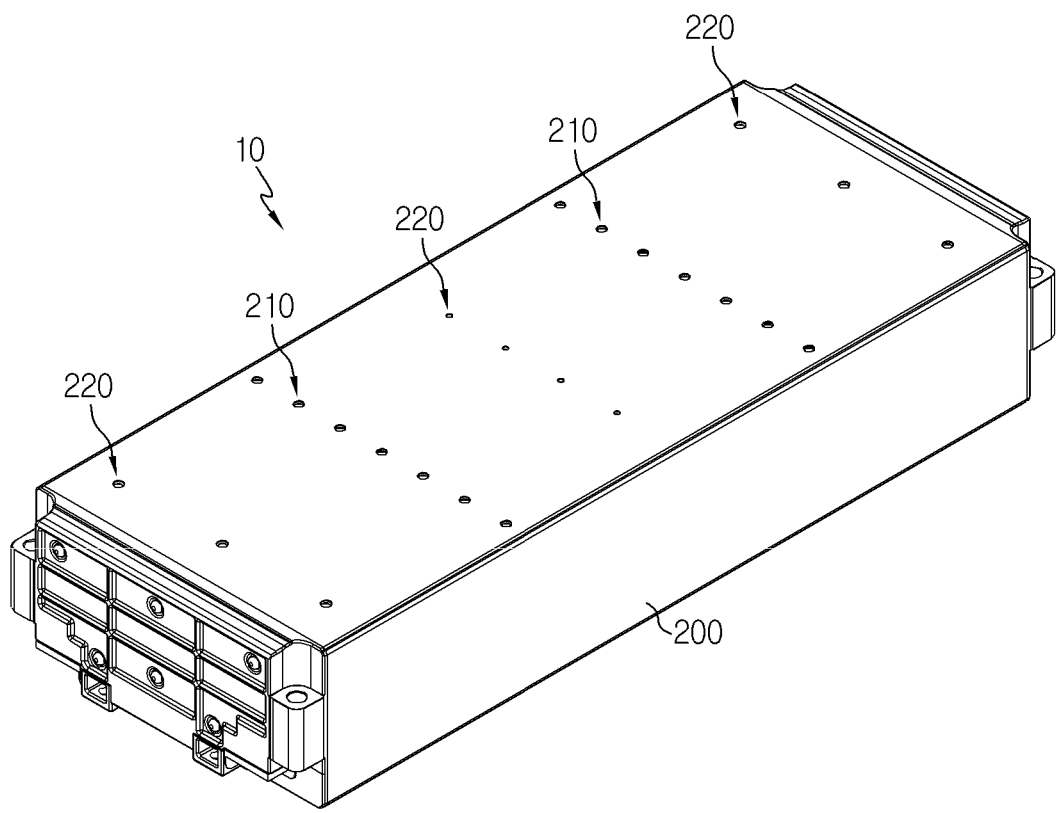
FIG. 2 is a bottom perspective view of the battery module of FIG. 1.
Figure 3:
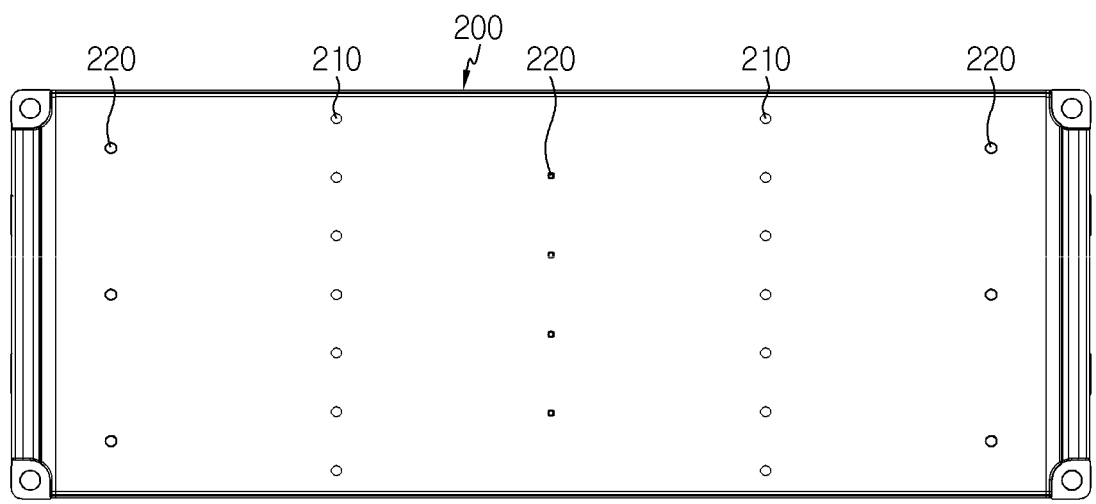
FIG. 3 is a bottom view of the battery module of FIG. 2.
Figure 4:
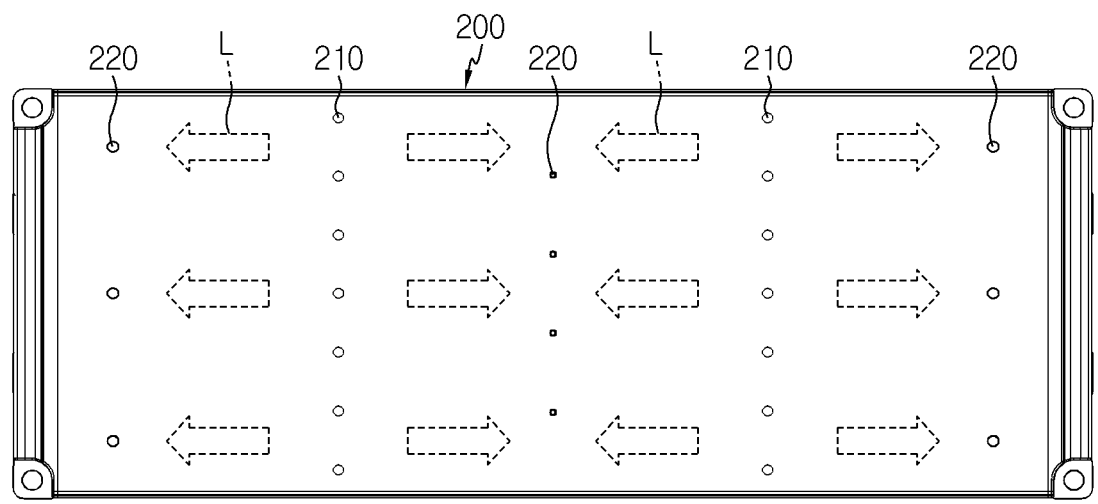
FIG. 4 is a view for describing a resin injection process of the battery module of FIG. 1.
Figure 5:
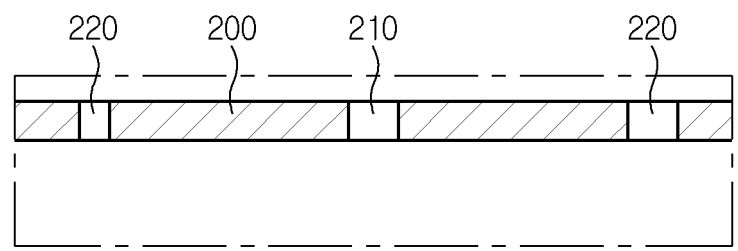
FIGS. 5 and 6 are views for describing shapes of resin injection holes according to various embodiments of the battery module of FIG. 4.
Figure 6:
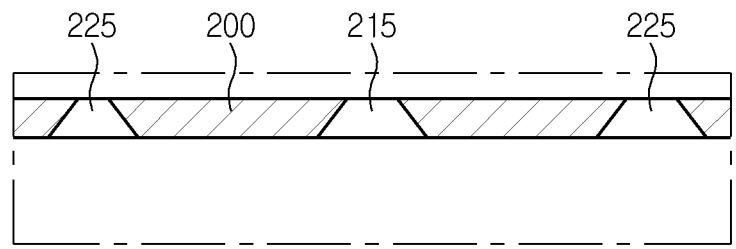
Figure 7:
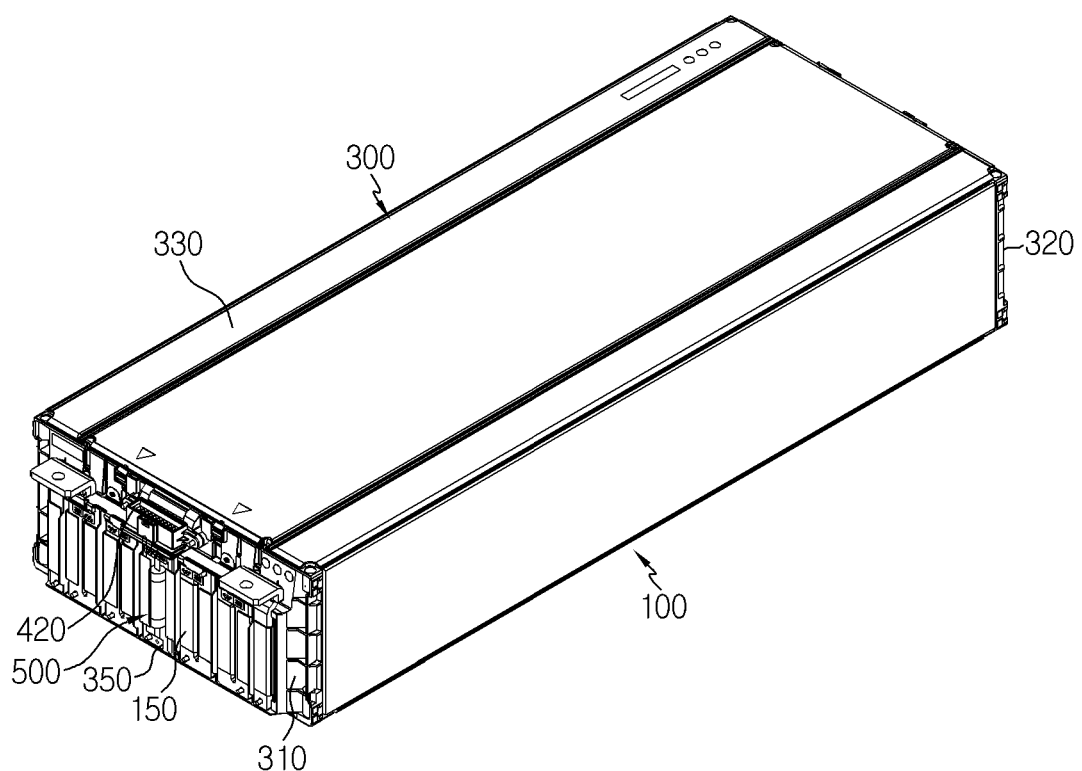
FIG. 7 is a view illustrating the battery module of FIG. 1 without a module case.
Figure 8:
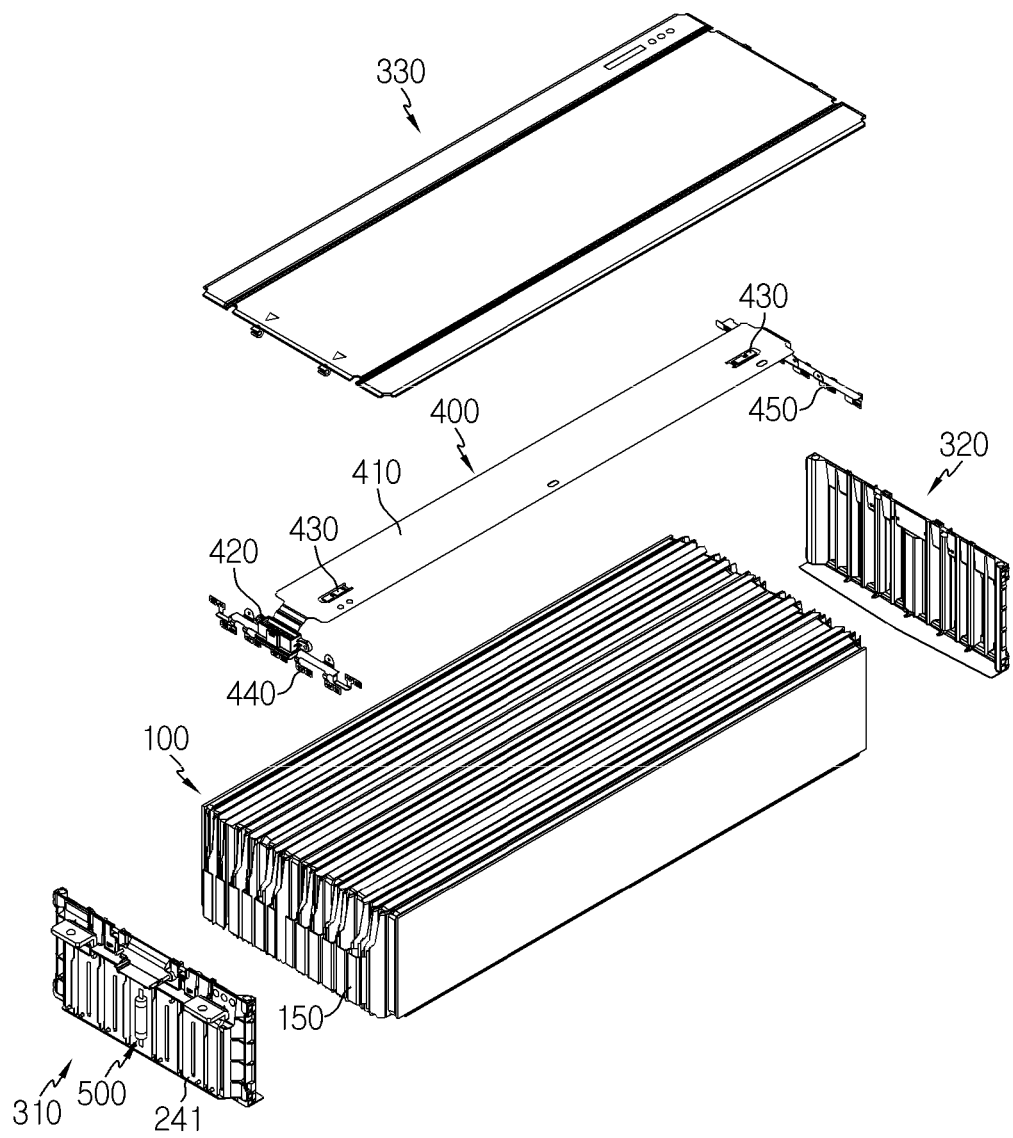
FIG. 8 is an exploded perspective view of the battery module of FIG. 7.
Figure 9:
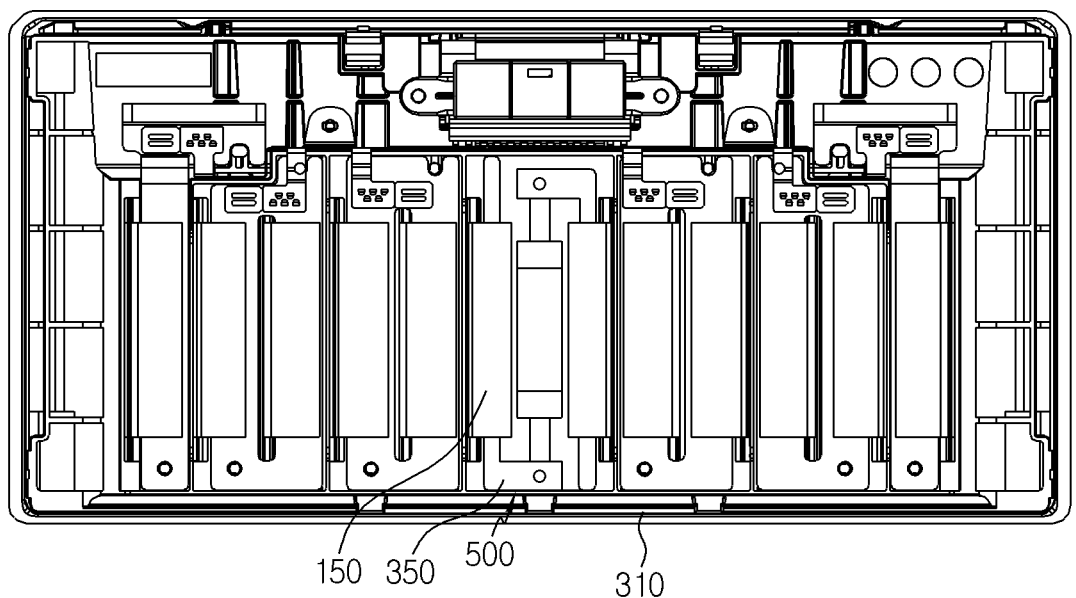
FIG. 9 is a front view of the battery module of FIG. 7.
Figure 10:
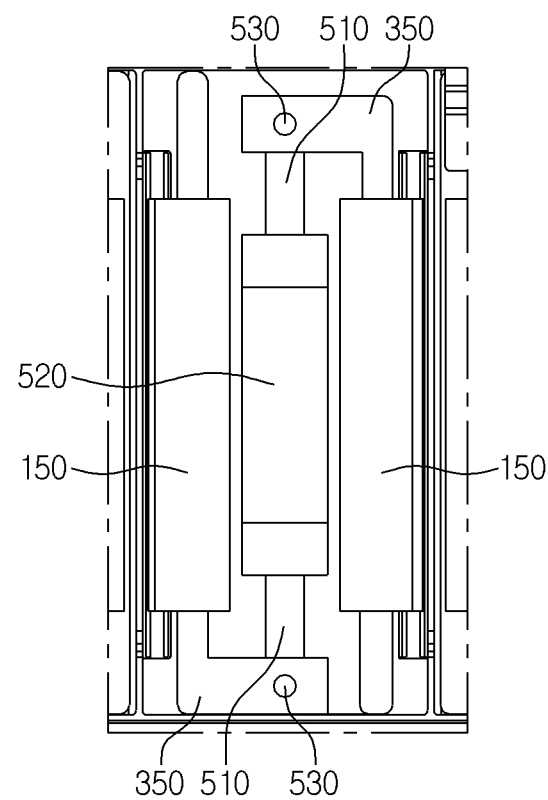
FIG. 10 is a magnified view of a major part of the battery module of FIG. 9.

FIG. 1 is a view for describing a battery module 10 according to an embodiment of the present disclosure, FIG. 2 is a bottom perspective view of the battery module 10 of FIG. 1, FIG. 3 is a bottom view of the battery module 10 of FIG. 2, FIG. 4 is a view for describing a resin injection process of the battery module 10 of FIG. 1, FIGS. 5 and 6 are views for describing shapes of resin injection holes according to various embodiments of the battery module 10 of FIG. 4, FIG. 7 is a view illustrating the battery module 10 of FIG. 1 without a module case, FIG. 8 is an exploded perspective view of the battery module 10 of FIG. 7, FIG. 9 is a front view of the battery module 10 of FIG. 7, and FIG. 10 is a magnified view of a major part of the battery module 10 of FIG. 9.

Referring to FIGS. 1 to 10, the battery module 10 may include battery cells 100, a module case 200, a busbar frame assembly 300, a voltage sensing unit 400, and a fuse unit 500.

The battery cells 100 may be secondary batteries and be provided as pouch-type secondary batteries. Each pouch-type secondary battery may include an electrode assembly, an electrolyte, and an external pouch. The external pouch may include two pouches, and at least one of the two may have a recessed internal space. The electrode assembly and the electrolyte may be accommodated in the internal space of the external pouch. Sealing portions may be provided on outer circumferential surfaces of the two pouches and be fused together to seal the internal space accommodating the electrode assembly.

A plurality of battery cells 100 may be provided. The plurality of battery cells 100 may be stacked on one another to be electrically connected to each other. Each of the plurality of battery cells 100 is a long cell having a length greater than a width thereof compared to conventional battery cells. For example, the length of the long cell may be about 3 to 5 times greater than the width thereof. The battery module 10 according to the present disclosure employs the long-cell-type battery cells 100 in order to easily mount the battery module 10 under, for example, the seats or trunk of a vehicle by reducing the height and increasing the capacity of the battery module 10. However, the scope of the present disclosure is not limited thereto.

Each of the plurality of battery cells 100 may include a pair of electrode leads 150 respectively protruding in front and rear directions of the battery module 10.

The pair of electrode leads 150 are located at a side from a width-direction centerline of the battery cell 100 and at a lower side along a height direction of the battery module 10.

The pair of electrode leads 150 are located at a side from a width-direction centerline of the battery cell 100 as described above in order to increase an energy density of the battery module 10 by providing a space for mounting, for example, a connector member 420 to be described below.

The module case 200 may accommodate the plurality of battery cells 100 and form the exterior of the battery module 10. In this regard, the module case 200 may have a predetermined-sized space capable of accommodating the battery cells 100.

The module case 200 is provided in a rectangular tube shape. The space in the module case 200 has a volume capable of tightly accommodating the battery cells 100 and the busbar frame assembly 300 to be described below. The above-described module case 200 may be effective to reduce the weight and volume of the battery module 10.

One or more resin injection holes 210 through which a thermally conductive resin L is injectable are provided in a surface of the module case 200. Herein, the surface of the module case 200 may be a bottom surface corresponding to bottom surfaces of the battery cells 100.

Specifically, a plurality of resin injection holes 210 are located between a length-direction central region and both side regions of the bottom surface of the module case 200. Checking holes 220 may be further provided in the central region and the both side regions. The checking holes 220 are used to check whether the resin L has permeated to the corresponding regions. For example, the amount of the injected resin L may be controlled by stopping injection of the resin L when the resin L is observed through the checking holes 220.

The resin injection holes 210 and the checking holes 220 may have a rectangular cross-section as illustrated in FIG. 5, or have a trapezoidal cross-section as illustrated in FIG. 6 to facilitate injection of the resin L into the module case 200.

The busbar frame assembly 300 may be slidably inserted into the module case 200 to support the plurality of battery cells 100.

The busbar frame assembly 300 may include a front frame 310, a rear frame 320, a top frame 330, and a plurality of busbars 350.

The front and rear frames 310 and 320 may include the plurality of busbars 350. The top frame 330 may connect the front frame 310 to the rear frame 320.

Specifically, the front, rear, and top frames 310, 320, and 330 may cover and have sizes corresponding to a front surface, a rear surface, and a top surface of the battery cells 100, respectively.

Herein, the front and rear frames 310 and 320 are provided to be rotatable about the top frame 330 in order to facilitate assembly of the battery cells 100 and the busbar frame assembly 300.

In this regard, the front and rear frames 310 and 320 may be rotatably hinge-coupled to the top frame 330. That is, the front and rear frames 310 and 320 may be hinge-coupled to an end and the other end of the top frame 330, respectively.

The plurality of busbars 350 may be provided on the front and rear frames 310 and 320 and be electrically connected to the electrode leads 150 of the plurality of battery cells 100.

In this regard, the plurality of busbars 350 may be electrically connected to the electrode leads 150 of the plurality of battery cells 100 through, for example, welding.

The voltage sensing unit 400 may serve to sense, for example, voltage information of the battery cells 100 and include a flexible printed circuit board (FPCB) member 410, connector members 420, temperature sensors 430, and sensing terminals 440 and 450.

The FPCB member 410 may extend between the top frame 330 and the top surface of the battery cells 100 along a length direction of the battery cells 100. The FPCB member 410 may be configured as a flexible printed circuit board.

The connector members 420 may be electrically connected to the FPCB member 410 and transmit, for example, data obtained from the temperature sensors 430 and the sensing terminals 440 and 450, to a battery management system (BMS).

The temperature sensors 430 may be provided on the FPCB member 410 and be located near both sides of the battery cells 100. Because the battery cells 100 generally have the highest temperature near the electrode leads 150, the temperature sensors 430 may be located at the both sides of the battery cells 100.

The sensing terminals 440 and 450 may include first sensing terminals 440 respectively attached to the busbars 350 located on the front frame 310, and second sensing terminals 450 respectively attached to the busbars 350 located on the rear frame 320, and sense voltage values at the busbars 350.

The fuse unit 500 is a component which is disconnected to cut off a current of the battery module 10 when the current exceeds an allowable current of the battery cells 100, and may be connected to at least one pair of busbars 350 from among the plurality of busbars 350 and be provided between the plurality of busbars 350 in the module case 200. Herein, the plurality of busbars 350 may be symmetrically provided on at least one of front and rear surfaces of the busbar frame assembly 300 by disposing the fuse unit 500 between the plurality of busbars 350.

As such, the fuse unit 500 may be provided in the middle of at least one of the front and rear surfaces of the busbar frame assembly 300. That is, the fuse unit 500 may be provided on at least one of the front and rear frames 310 and 320. In brief, the fuse unit 500 may be provided in the middle of the at least one of the front and rear frames 310 and 320.

The fuse unit 500 may include connection members 510, a fuse body 520, and coupling members 530.

A pair of connection members 510 may be provided and be connected to the at least one pair of busbars 350. The fuse body 520 may be provided between the pair of connection members 510 and be disconnected to physically cut off a current of the battery module 10 when the current exceeds a predetermined value that is an allowable current, in order to prevent, for example, explosion of the battery module 10. A pair of coupling members 530 may be provided to couple the pair of busbars 350 to the pair of connection members 510.

As described above, in the current embodiment, because the fuse unit 500 is not provided outside the battery module 10 but is provided between the busbars 350 of the busbar frame assembly 300 in the battery module 10, occupation of a space by the fuse unit 500 outside the module case 200 of the battery module 10 may be fundamentally prevented.

As such, in the current embodiment, when the battery module 10 is mounted in a battery pack 1 to be described below, or another structure, spatial loss or spatial restriction caused by the space occupied by the fuse unit 500 does not occur.

Therefore, the battery module 10 according to the current embodiment may minimize a dead space generated due to mounting of the fuse unit 500.

Figure 11:
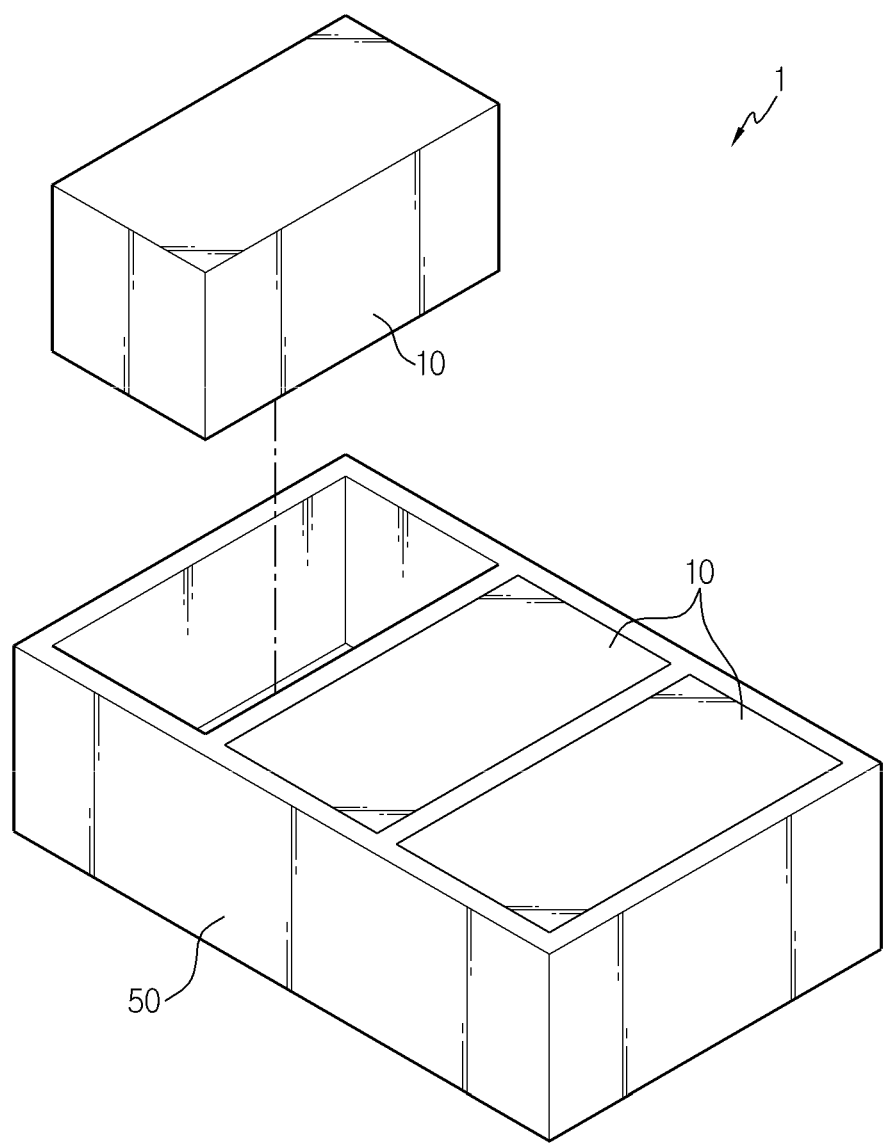
FIG. 11 is a view for describing a battery pack according to an embodiment of the present disclosure.
Figure 12:
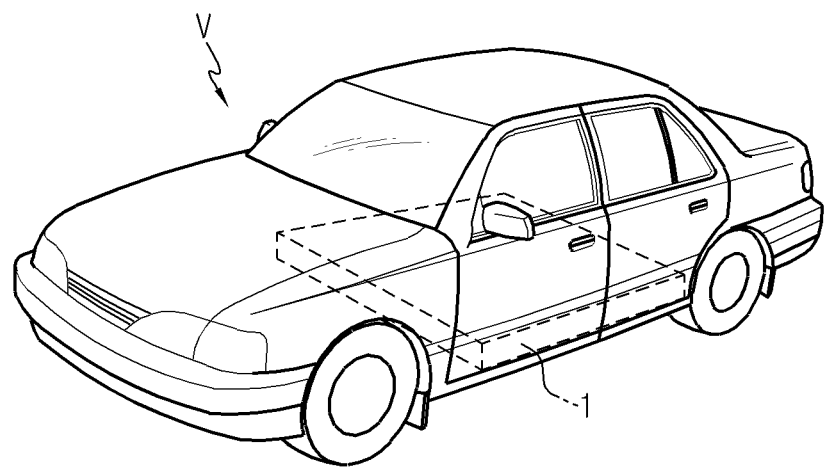
FIG. 12 is a view for describing a vehicle according to an embodiment of the present disclosure.

FIG. 11 is a view for describing a battery pack 1 according to an embodiment of the present disclosure, and FIG. 12 is a view for describing a vehicle V according to an embodiment of the present disclosure.

Referring to FIGS. 11 and 12, the battery pack 1 may include at least one battery module 10 according to the previous embodiment, and a pack case 50 configured to package the at least one battery module 10.

The battery pack 1 may be included in the vehicle V as an energy source of the vehicle V. For example, the battery pack 1 may be included in the vehicle V, e.g., an electric vehicle, a hybrid vehicle, or any other vehicle capable of using the battery pack 1 as an energy source.

In addition to the vehicle V, the battery pack 1 may also be included in any system, apparatus, or equipment using secondary batteries, e.g., an energy storage system (ESS).

Because the battery pack 1 according to the current embodiment and the system, apparatus, or equipment including the battery pack 1, e.g., the vehicle V, include the above-described battery module 10, the battery pack 1 having all advantages of the above-described battery module 10 and the system, apparatus, or equipment including the battery pack 1, e.g., the vehicle V, may be implemented.

According to the afore-described various embodiments, the battery module 10 capable of minimizing a dead space generated due to mounting of the fuse unit 500, the battery pack 1 including the battery module 10, and the vehicle V including the battery pack 1 may be provided.

While the present disclosure has been particularly shown and described with reference to embodiments thereof, it will be understood by one of ordinary skill in the art that various changes in form and details may be made therein without departing from the scope of the present disclosure as defined by the following claims and their equivalents.

What is claimed is:

1. A battery module comprising:
   a plurality of battery cells, each of the plurality of battery cells having a pair of electrode leads respectively protruding in front and rear directions of the battery module;
   a module case accommodating the plurality of battery cells therein;
   a busbar frame assembly slidably inserted into the module case to support the plurality of battery cells, the busbar frame assembly comprising a plurality of busbars electrically connected to the electrode leads of the plurality of battery cells; and
   a fuse unit connected to at least one pair of busbars of the plurality of busbars, the fuse unit being provided between the at least one pair of busbars, the fuse unit being disposed at a middle of a front surface or a rear surface of the busbar frame assembly between adjacent electrode leads of adjacent battery cells, wherein the plurality of busbars are symmetrically distributed on opposite sides of the fuse unit, such that the fuse unit is disposed within an arrangement of the plurality of busbars.

2. The battery module of claim 1, wherein the fuse unit comprises:
   a pair of connection members connected to the at least one pair of busbars; and
   a fuse body disposed between the pair of connection members, the fuse body configured to be disconnected when a current over a predetermined value flows to the fuse body.

3. The battery module of claim 2, wherein the fuse unit further comprises a pair of coupling members configured to couple the at least one pair of busbars to the pair of connection members.

4. The battery module of claim 1, wherein the busbar frame assembly comprises:
   front and rear frames comprising the plurality of busbars; and
   a top frame connecting the front frame to the rear frame,
   wherein the fuse unit is disposed on the front frame or the rear frame.

5. The battery module of claim 4, wherein the fuse unit is disposed at a middle of the front frame or the rear frame.

6. The battery module of claim 4, wherein each of the front frame and the rear frame is rotatably hinge-coupled to the top frame.

7. A battery pack comprising:
   one or more battery modules, each of the battery modules being the battery module according to claim 1; and
   a pack case configured to package the one or more battery modules.

8. A vehicle comprising the battery pack according to claim 7.

9. A battery pack comprising:
   a plurality of battery cells, each of the plurality of battery cells having a pair of electrode leads respectively protruding in front and rear directions of the battery module;
   a busbar frame assembly supporting the plurality of battery cells, the busbar frame assembly comprising a plurality of busbars electrically connected to the electrode leads of the plurality of battery cells; and
   a fuse unit connected to at least one pair of busbars of the plurality of busbars, the fuse unit being provided between the at least one pair of busbars, the fuse unit being disposed at a middle of a front surface or a rear surface of the busbar frame assembly between adjacent electrode leads of adjacent battery cells,
   wherein the plurality of busbars are symmetrically distributed on opposite sides of the fuse unit, such that the fuse unit is disposed within an arrangement of the plurality of busbars.

* * * * *